United States Patent
Uehara et al.

(10) Patent No.: US 6,962,677 B2
(45) Date of Patent: Nov. 8, 2005

(54) METHOD AND APPARATUS FOR COMBUSTION HARMFULNESS-ELIMINATION OF PFC GAS

(75) Inventors: Masayuki Uehara, Tokyo (JP); Hiroyasu Yamamiti, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 419 days.

(21) Appl. No.: 10/126,411

(22) Filed: Apr. 19, 2002

(65) Prior Publication Data

US 2002/0182130 A1 Dec. 5, 2002

(30) Foreign Application Priority Data

Apr. 20, 2001 (JP) .......................................... 2001-123519

(51) Int. Cl.[7] .............................................. B01D 53/46
(52) U.S. Cl. .......................... 422/171; 422/172; 422/173
(58) Field of Search ................................ 422/168–172, 422/173

(56) References Cited

U.S. PATENT DOCUMENTS 5,123,836 A * 6/1992 Yoneda et al. ................. 431/5
5,800,792 A * 9/1998 Ibaraki et al. ............... 422/171
6,482,367 B1 * 11/2002 Imamura ...................... 422/173

FOREIGN PATENT DOCUMENTS

| JP | 62-238365 | * 10/1987 |
| JP | 10-249143 | 9/1998 |

* cited by examiner

*Primary Examiner*—Hien Tran
(74) *Attorney, Agent, or Firm*—Choate Hall & Stewart LLP

(57) ABSTRACT

An apparatus for combustion harmfulness-elimination of PFC gas is provided, which prevents or effectively suppress the generation of byproducts and the corrosion of the inner walls of the apparatus. This apparatus comprises (a) a combustion furnace; (b) a gas introduction section formed near the combustion furnace; (c) a wet scrubber for wet-scrubbing a first gas; and (d) a connection pipe for connecting the gas introduction section to the scrubber; the connection pipe having a branch extending downward. Even if moisture is absorbed into the first gas during the wet-scrubbing process in the wet scrubber, the moisture in the first gas is automatically separated therefrom in a liquid state and flows out of the apparatus through the branch prior to reaching the gas introduction section.

8 Claims, 5 Drawing Sheets

METHOD AND APPARATUS FOR COMBUSTION HARMFULNESS-ELIMINATION OF PFC GAS

BACKGROUND OF THE INVENTION

1. Field of the Invention

The present invention relates to a method and an apparatus for combustion harmfulness-elimination of PFC (perfluoro-compound) gas. More particularly, the invention relates to a method and an apparatus for eliminating the noxious substances of PFC gas through combustion, which prevent or effectively suppress the corrosion in the apparatus and the generation of byproducts due to combustion of PFC gas, thereby reducing the number of cleaning and/or part-exchange operations for the apparatus.

2. Description of the Related Art

In the fabrication process sequence of semiconductor devices, dry etching apparatuses are frequently used. In such the dry etching process for semiconductor device fabrication, a PFC gas such as sulfur hexafluoride $SF_6$ and trifluoromethane ($CHF_3$) is often supplied to the dry etching apparatus in the form of gaseous mixture consisting of a PFC gas and a chlorine (Cl)-based gas or a carrier gas such as helium (He).

PFC gasses are generally harmful and therefore, they are usually subjected to a combustion harmfulness-elimination process prior to discharge or release to the atmosphere, in other words, they are contacted with flames to decompose the harmful constituent(s) to unharmful substance(s).

For example, the Japanese Non-Examined Patent Publication No. 10-249 143 published in 1998 discloses a method of treating a waste gas using the combustion harmfulness-elimination process. In this method, a waste gas to be treated (e.g., a gas containing silane ($SiH_4$) and at least one volatile inorganic hydrogen compound, such as arsine ($AsH_3$), phosphine ($PH_3$), and diborane ($B_2H_6$) is contacted with flames for eliminating its harmfulness.

FIG. 1 schematically shows a conventional apparatus 50 for combustion harmfulness-elimination of PFC gas, which comprises a wet scrubber 52, a gas introduction section 56, a combustion furnace 57, and a combustion control section 58.

An introduction pipe 51 is connected to the inlet of the scrubber 52. A first gaseous mixture M1 is introduced into the apparatus 50 and sent to the inlet of the scrubber 52 by way of the pipe 51. The outlet of the scrubber 52 is connected to the inlet of the gas introduction section 56 by way of connection pipes 53 and 55.

An introduction pipe 54 is connected to the connection point of the pipes 53 and 55. A second gaseous mixture M2 is introduced into the apparatus 50 and sent to the inlet of the section 56 by way of the pipes 54 and 55. The gas introduction section 56 is connected to the combustion control section 58. The combustion control section 58 is connected to the combustion furnace 57. The combustion control section 58 has a combustion gas introduction section 59 for introducing a combustion gas CG into the section 58.

The combustion control section 58 controls the combustion or burning state in the furnace 57. In other words, the section 58 generates flames 60 by burning the combustion gas CG introduced by way of the section 59, and eliminates the flames 60, according to the necessity.

The furnace 57 has an air introduction section 61 and an outlet or exhaust port 62. The air introduction section 61 is used to introduce the air for diluting the gaseous compound generated in the furnace 57 by the combustion harmfulness-elimination process as the diluting air DA. The outlet port 62 is used to discharge the diluted gaseous compound in the furnace 57 into the atmosphere as an exhaust gas EX.

On operation, for example, a mixture of a PFC gas (e.g., $SF_6$ or $CHF_3$) and a Cl-based gas as the first gaseous mixture M1 is introduced into the apparatus 50 and sent to the scrubber 52 by way of the pipe 51. The Cl-based gas contained in the mixture M1 is removed in the scrubber 52 by wet scrubbing treatment, resulting in a processed mixture M1' containing the PFC gas. The processed mixture M1' is sent to the gas introduction section 56 by way of the pipes 53 and 55.

On the other hand, a mixture of the same PFC gas as the first mixture M1 and He gas as its carrier, which is the second gaseous mixture M2, is introduced into the apparatus 50 through the pipe 54. Then, the mixture M2 is sent to the gas introduction section 56 by way of the pipe 55.

The PFC gas contained in the processed mixture M1 and the second mixture M2, which has been sent to the gas introduction section 56, is then sent to the inside of the combustion furnace 57 where the flames 60 are formed. The flames 60 are generated by burning the combustion gas CG introduced through the section 59 under the control of the section 59. In the furnace 57, the PFC gas contained in the mixtures M1 and M2 is burnt and decomposed to unharmful or less-harmful gaseous substances. The unharmful or less-harmful substances thus generated are diluted by the air DA introduced through the section 61 and then, discharged from the furnace 57 by way of the outlet or exhaust port 62 as an exhaust gas EX.

With the conventional apparatus 50, there is a problem that byproducts are generated and deposited onto the inner walls of the combustion control section 58 after approximately one month's use, which induces the insufficient combustion efficiency. Thus, the inside of the apparatus 50 needs to be cleaned once approximately per month. Moreover, there is another problem that corrosion occurs on the inner walls of the gas introduction section 56.

SUMMARY OF THE INVENTION

The invention was created to solve the above-described problems of the above-described problems of the above-described conventional apparatus 50 for combustion harmfulness-elimination of PFC gas.

Accordingly, an object of the present invention is to provide a method and an apparatus for combustion harmfulness-elimination of PFC gas that prevent or effectively suppress the generation of byproducts and the corrosion of the inane-walls of the apparatus.

Another object of the present invention is to provide a method and an apparatus for combustion harmfulness-elimination of PEG gas that decreases the number of cleaning operations and the number of part-exchange operations.

The above objects together with others not specifically mentioned will become clear to those skilled in the art from the following description.

According to the first aspect of the invention, an apparatus for combustion harmfulness-elimination of PFC gas is provided. This apparatus comprises:

(a) a combustion furnace;

(b) a gas introduction section formed near the combustion furnace;

(c) a wet scrubber for wet-scrubbing a first gas; and (d) a connection pipe for connecting the gas introduction section to the scrubber;

the connection pipe having a branch extending downward.

To find the cause of the deposition of byproducts and the corrosion the inner walls, the inventors made analysis of the byproducts and researched to recognize a proper piping system of the apparatus. As a result, they found that (1) corrosive byproducts were generated by acid based on acid gas (e.g., HF, $SOF_2$, or the like) produced through etching reaction and moisture carried from the wet scrubber, that (2) generation of the byproducts is accelerated by the moisture, and that (3) corrosion of the inner walls is accelerated by the moisture.

With the apparatus for combustion harmfulness-elimination of PFC gas according to the first aspect of the invention, the connection pipe for connecting the gas introduction section to the scrubber has the branch extending downward. Therefore, even if moisture is absorbed into the first gas during the wet-scrubbing process in the wet scrubber, the moisture in the first gas is automatically separated therefrom in a liquid state and flows out of the apparatus through the branch prior to reaching the gas introduction section. Thus, the moisture in the first gas can be removed or effectively decreased.

As a result, the generation of byproducts and the corrosion of the inner walls of the apparatus are prevented or effectively suppressed. This means that the number of cleaning operations and the number of part-exchange operations are decreased.

In a preferred embodiment of the apparatus according to the first aspect of the invention, inner walls of the gas introduction section are coated by fluororesin. In this embodiment, there is an additional advantage that the advantages of the invention are enhanced.

In another preferred embodiment of the apparatus according to the first aspect of the invention, an introduction pipe is additionally provided in such a way as to be connected to the connection pipe at a location between the branch and the gas introduction section. In this embodiment, there is an additional advantage that a second gas can be simultaneously introduced into the apparatus along with the first gas.

In still another preferred embodiment of the apparatus according to the first aspect of the invention, the connection pipe has a protrusion in its inside. The protrusion is located at a branching portion of the connection pipe from which the branch is extended. The protrusion is formed in such a way as to intersect with a flowing direction of the first gas. In this embodiment, since the first gas flowing through the connection pipe collides with the protrusion, the separation of the moisture contained in the first gas is facilitated. Thus, there is an additional advantage that the moisture in the first gas can be removed more efficiently.

It is preferred what the branch of the connection pipe is connected to the combustion furnace. In this case, the moisture separated from the first gas is automatically introduced into the furnace and therefore, the moisture can be discharged with the exhaust gas. Thus, there is an additional advantage that no draining device is necessary for the moisture thus separated. Moreover, since the moisture introduced into the furnace is vaporized in the furnace held at high temperature, lowering the vapor pressure. As a result, there is another additional advantage that the moisture separation from the first gas is accelerated.

Preferably, a moisture keeper device is provided at an end of the branch in the furnace. In this case, the moisture separated from the first gas is placed on the moisture keeper device and therefore, there is another additional advantage that the moisture separated does not contact directly the inner wall of the furnace.

According to the second aspect of the invention, a method for combustion harmfulness-elimination of the PFC gas is provided. This method comprises the steps of:

(a) introducing a first gaseous mixture of a PFC gas and Cl-based gas into a wet scrubber, thereby removing the Cl-based gas from the first mixture;

(b) adjusting a moisture quantity of the PFC gas obtained from the first mixture;

(c) supplying the PFC gas obtained from the first mixture and having an adjusted moisture quantity to a gas introduction section;

(d) introducing a second gaseous mixture of a PFC gas and a carrier gas into the gas introduction section;

(e) supplying the PFC gas obtained from the first mixture and having the adjusted moisture quantity and the second mixture to a combustion furnace for combustion harmfulness-elimination of the PEG gas.

With the method for combustion harmfulness-elimination of PFC gas according to the second aspect of the invention, the moisture quantity of the PFC gas obtained from the first mixture is adjusted prior to combustion harmfulness-elimination of the PFC gas in the furnace. Therefore, the same advantages as those of the apparatus according to the first aspect of the invention are obtainable.

In a preferred embodiment of the method according to the second aspect of the invention, inner walls of the gas introduction section are coated by fluororesin. In this embodiment, there is an additional advantage that the advantages of the invention are enhanced.

In another preferred embodiment of the method according to the second aspect of the invention, the moisture separated from first mixture in the step (b) is supplied to the furnace by way of a bypass. In this embodiment, there is an additional advantage that no draining device is necessary for the moisture thus separated, and that the moisture separation from the first gas is accelerated.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
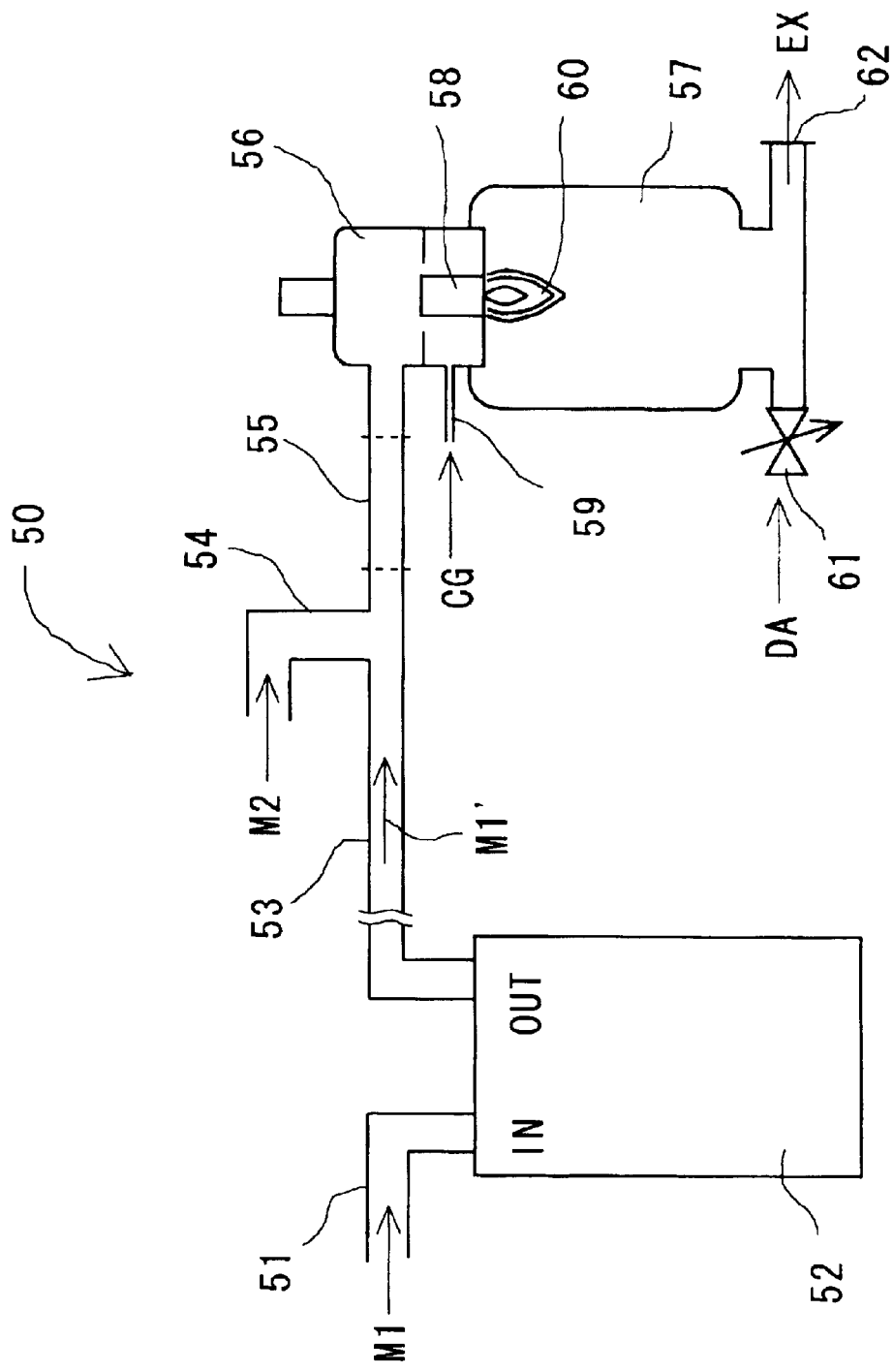
FIG. 1 is a schematic view showing the configuration of a conventional apparatus for combustion harmfulness-elimination of PFC gas.

Preferred embodiments of the present invention will be described in detail below while referring to the drawings attached.

First Embodiment

Figure 2:
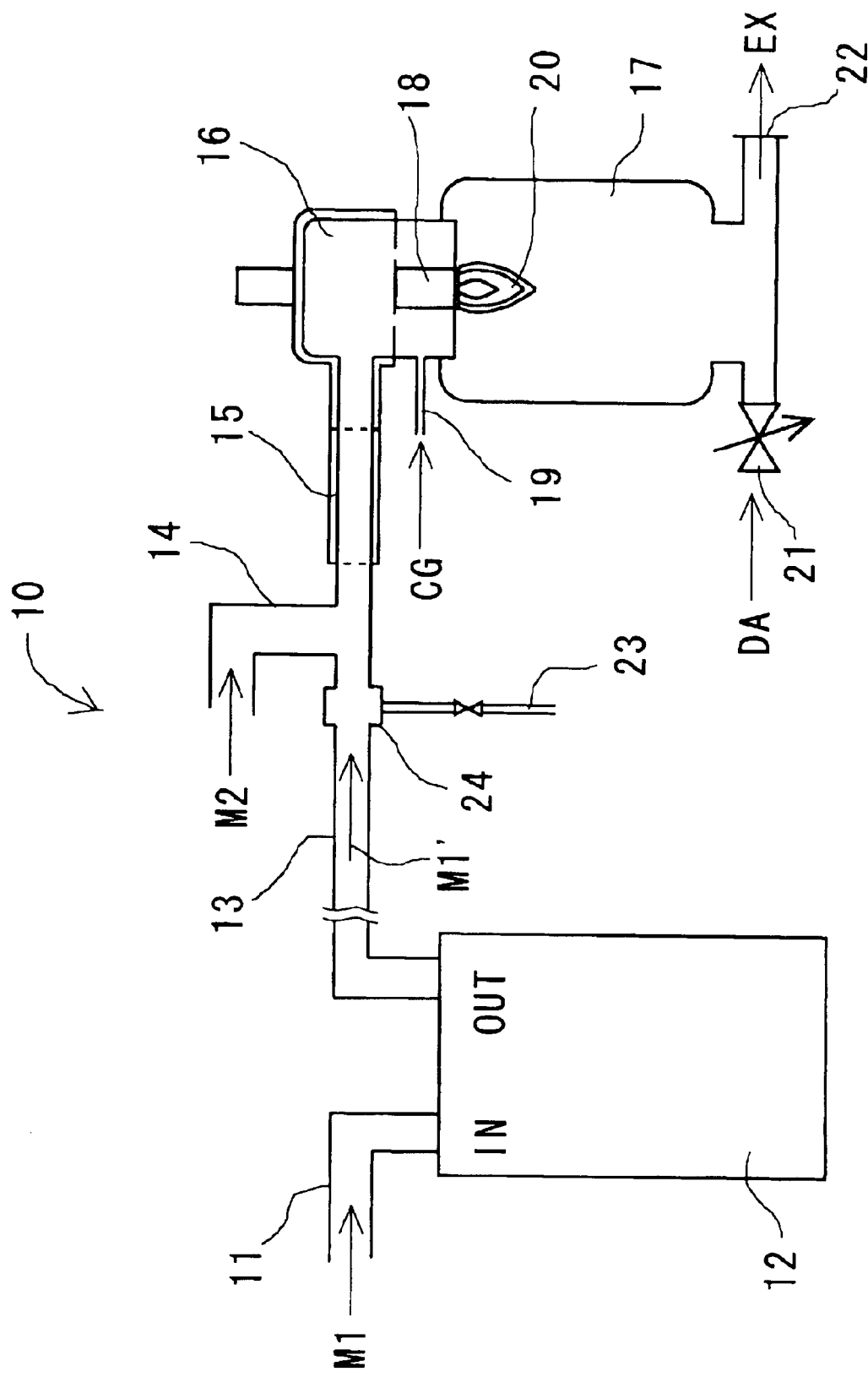
FIG. 2 is a schematic view showing the configuration of an apparatus for combustion harmfulness-elimination of PFC gas according to a first embodiment of the invention.

FIG. 2 schematically shows an apparatus 10 for combustion harmfulness-elimination of PFC gas according to a first embodiment of the invention.

As shown in FIG. 1, the apparatus 10 comprises a wet scrubber 12, a gas introduction section 16, a combustion furnace 17, and a combustion control section 18.

An introduction pipe 11 is connected to the inlet of the scrubber 12. A first gaseous mixture M1 is introduced into the apparatus 10 and sent to the inlet of she scrubber 12 by way of the pipe 11. The first mixture M1 is a mixture of a specific PFC gas and a Cl-based gas. The mixture M1 needs to pass through the scrubber 12 to separate the Cl-based gas from the PFC gas. The outlet of the scrubber 12 is connected to the inlet of the gas introduction section 16 by way of connection pipes 13 and 15.

An introduction pipe 14 is connected to the connection point of the pipes 13 and 15. A second gaseous mixture M2 is introduced into the apparatus 10 and sent to the inlet of the gas introduction section 16 by way of the pipes 14 and 15. The second mixture M2 is a mixture of the same PFC gas as the first mixture M1 and a carrier gas (e.g., He). Therefore, the mixture M2 need not to pass through the scrubber 12.

The gas introduction section 16 is connected to the combustion control section 18. The section 18 is connected to the combustion furnace or chamber 17. The combustion control section 18 has a combustion gas introduction section 19 for introducing a combustion gas CG into the section 18.

In the apparatus 10 of the first embodiment, the inner walls of the gas introduction section 16 are covered with fluororesin coating. The material and method of the fluororesin coating are not limited. Any known coating material and coating method are available. Needlass to say, fluororesin coating is not essential for the invention and thus, fluororesin coating may be omitted.

The connection pipe 13, which extends horizontally, has a branch 23 extending downward from the connection point 24 between is the scrubber 12 and the gas introduction section 16. The branch 23 is vertical to the horizontal portion of the pipe 13. The connection point 24 is formed to separate the moisture from the first mixture M1 to generate a liquid. The branch 23 is designed in such a way that the liquid thus separated from the first mixture M1 will flow downward naturally to the outside of the apparatus 10.

The combustion control section 18 controls the combustion or burning state in the furnace 17. In other words, the section 18 generates flames 20 by burning the combustion gas CG introduced by way of the section 19, and eliminates the flames 20, according to the necessity.

The furnace 17 has an air introduction section 21 and an outlet or exhaust port 22. The air introduction section 21 is used to introduce the air for diluting the gaseous compound generated in the furnace 17 by the combustion harmfulness-elimination process as the diluting air DA. The outlet port 22 is used to discharge the diluted gaseous compound in the furnace 17 into the atmosphere as an exhaust gas EX.

Figure 5:
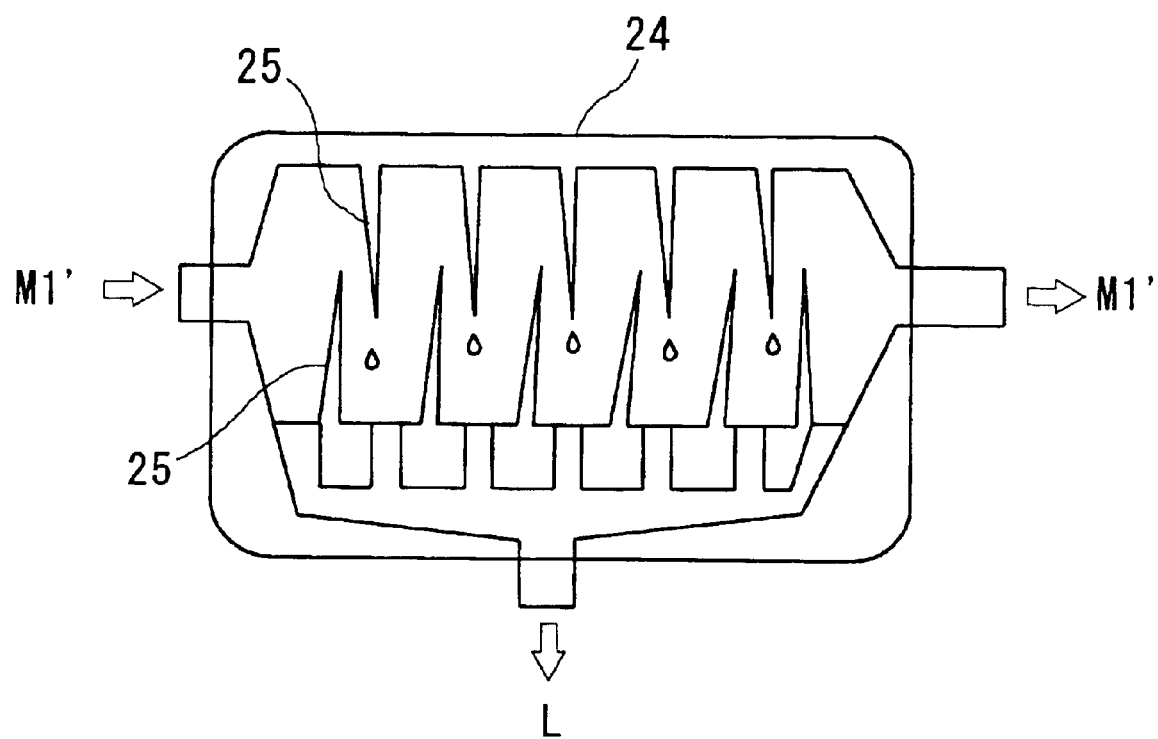
FIG. 5 is a schematic, enlarged, cross-sectional view showing the configuration of the connection part of the connection pipe to the branch in the apparatus according to the first embodiment of the invention.

In the connection point 24 of the connection pine 13, protrusions 25 are formed, as shown in FIG. 5. The protrusions 25 are perpendicular to the flowing direction of the processed first gaseous mixture M1' that has passed through the wet scrubber 12. The mixture M1' flowing through the pipe 13 will collide with the protrusions 25 in the point 24 and as a result, the moisture contained in the mixture M1' is easily condensed to be attached onto the surfaces of the protrusions 25. When the quantity of the condensed moisture reaches a specific limit, the condensed moisture will separate from the protrusions 25 and fall into the branch 23. Then, the condensed moisture will fall out of the branch 23 in the form of liquid L as a drain.

No limitation is applied to the materials used for the apparatus 10. Conventional materials may be used for this purpose.

Next, the operation of the apparatus 10 according to the first embodiment is explained below.

On operation, a mixture of a PFC gas (e.g., $SF_6$ or $CHF_3$) and a Cl-based gas as the first gaseous mixture M1 is introduced into the apparatus 10 and sent to the wet scrubber 12 by way of the pipe 11. The Cl-based gas contained in the mixture M1 is removed in the scrubber 12 by wet scrubbing treatment, resulting in the processed mixture M1'. Thus, the mixture M1' contains not only the PFC gas but also a large amount of moisture. The processed mixture M1' is sent to the gas introduction section 16 by way of the pipes 13 and 15.

Since the processed mixture M1' is sent to the gas introduction section 16 through the protrusions 25 provided in the connection point 24, the moisture in the mixture M1' is separated efficiently to be the liquid L. Thus, the moisture quantity of the mixture M1' is well adjusted. The moisture or liquid L thus separated is automatically discharged from the apparatus 10 by way of the branch 23.

On the other hand, as the second gaseous mixture M2, a mixture of the same PFC gas as the first mixture M1 and He gas as its carrier is introduced into the apparatus 10 through the pipe 14. Then, the mixture M2 is sent to the gas introduction section 16 by way of the pipe 15.

The PFC gas contained in the processed mixture M1' and the second mixture M2, which has been sent to the gas introduction section 16, is then sent to the inside of the combustion furnace 17 where the flames 20 are formed. The flames 20 are generated by burning the combustion gas CG introduced through the section 19 under the control of the section 18. In the furnace 17, the harmful PFC gas contained in the mixtures M1 and M2 is decomposed to unharmful or less-harmful gaseous substances. The unharmful or less-harmful gaseous substances thus generated are diluted by the air DA introduced through the section 21 and then, discharged from the furnace 17 by way of the outlet or exhaust port 22 as the exhaust gas EX.

With the apparatus 10 according to the first embodiment, the connection pipe 13 for connecting the gas introduction section 16 to the wet scrubber 12 has the branch 23 extending downward at the connection point 24. Therefore, even if moisture is absorbed into the first gaseous mixture M1 during the wet-scrubbing process in the wet scrubber 12, the moisture in the first mixture M1 is naturally separated therefrom in a liquid state and flows out of the apparatus 10 through the branch 23 prior to reaching the gas introduction section 16. Thus, the moisture in the first mixture M1 can be removed or effectively decreased.

As a result, the generation of byproducts and the corrosion of the inner walls of the apparatus 10 are prevented or effectively suppressed. This means that the number of cleaning operations and the number of part-exchange operations are decreased.

A method for combustion harmfulness-elimination of PFC gas according to the first embodiment of the invention is carried out with the above-described apparatus 10. In this method, as described in the explanation of the operation of the apparatus 10, the moisture quantity of the PFC gas obtained from the first mixture M1 is adjusted or decreased by the protrusions 25 and the branch 23 prior to combustion harmfulness-elimination of the PFC gas in the furnace 17. Therefore, in the method of the first embodiment, the same advantages as those of the apparatus 10 are obtainable.

Second Embodiment

Figure 3:
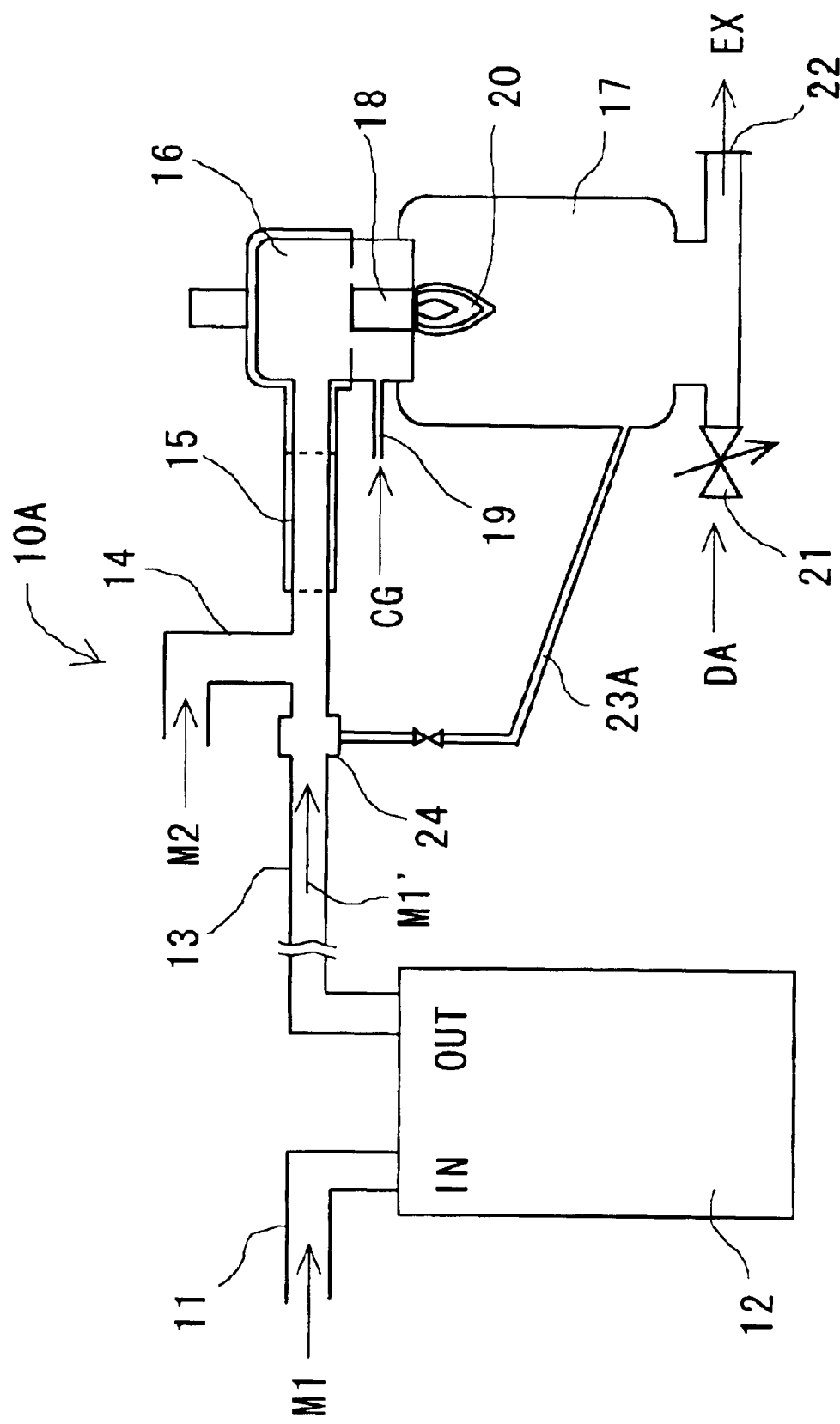
FIG. 3 is a schematic view showing the configuration of an apparatus for combustion harmfulness-elimination of PFC gas according to a second embodiment of the invention.

FIG. 3 shows the configuration of an apparatus 10A for combustion harmfulness-elimination of PFC gas according to a second embodiment of the invention.

The apparatus 10A has the same configuration as the apparatus 10 of the first embodiment, except that the branch 23 is replaced with a branch 23A. Therefore, the explanation about the same configuration is omitted here by attaching she same reference numerals and symbols as those in the first embodiment for the sake of simplification.

In the apparatus 10A, one end of the branch 23A is connected to the connection point 24 of the pipe 13 and the other end thereof is connected to the combustion furnace 17. Thus, she branch 23A serves as a bypass of the path for the mixtures M1' and M2 to the furnace 17.

The condensed moisture in the point 24 is introduced into the furnace 17 by way of the branch 23A. Since the inside of the furnace 17 is heated by the flames 20 to a high temperature, the moisture introduced into the furnace 17 will be evaporated, diluted by the diluting air DA, and discharged from the furnace 17 along with other gaseous compounds through the outlet 22 of the apparatus 10A as the exhaust gas. This means that no draining device is needed for the moisture, i.e., the liquid L.

Moreover, due to evaporation of the moisture or liquid L in the furnace 17, the vapor pressure in the furnace 17 is decreased. Therefore, the liquid L, which is the moisture separated from the mixture M1, is more likely to flow into the furnace 17 by way of the branch 23A as the bypass compared with the apparatus 10 of the first embodiment. This means that the moisture removal from the mixture M1 is accelerated.

A method for combustion harmfulness-elimination of PFC gas according to the second embodiment of the invention is carried out with the above-described apparatus 10A. In this method, like the first embodiment, the moisture quantity of the PFC gas obtained from the first mixture M1 is adjusted or decreased by the protrusions 25 and the branch 23A prior to combustion harmfulness-elimination of the PEC gas in the furnace 17. Therefore, in the method of the second embodiment, the same advantages as those of the apparatus 10A are obtainable.

Third Embodiment

Figure 4:
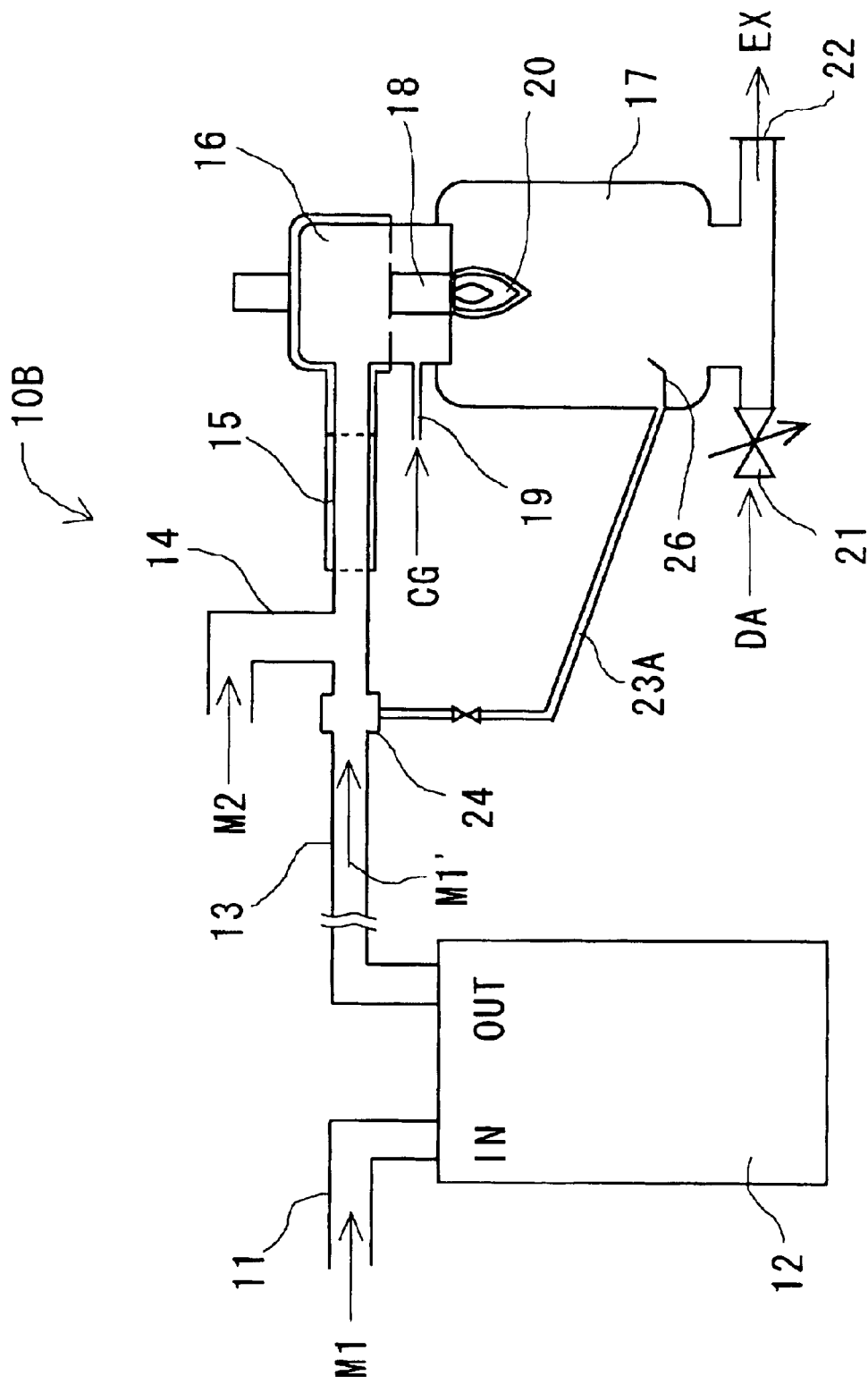
FIG. 4 is a schematic view showing the configuration of an apparatus for combustion harmfulness-elimination of PFC gas according to a third embodiment of the invention.

FIG. 4 shows the configuration of an apparatus 10B for combustion harmfulness-elimination of PFC gas according to a third embodiment of the invention.

The apparatus 10B has the name configuration as the apparatus 10A of the second embodiment, except that a moisture keeper device 26 is additionally provided at the end of the branch 23A in the furnace 17. Therefore, the explanation about the same configuration is omitted here by attaching the same reference numerals and symbols as those in the first embodiment for the sake of simplification.

In the apparatus 10B, one end of the branch 23A is connected to the connection point 24 of the pipe 13 and the other end thereof is connected to the combustion furnace 17. Thus, the branch 23A serves as a bypass of the path for the mixtures M1' and M2 to the furnace 17.

Like the apparatus 10A of the second embodiment, the condensed moisture in the point 24 is introduced into the furnace 17 by way of the branch 23A. Since the inside of the furnace 17 is heated by the flames 20 to a high temperature, the moisture introduced into the furnace 17 will be evaporated, diluted by the diluting air DA, and discharged from the furnace 17 along with other gaseous compounds through the outlet 22 of the apparatus 10B as the exhaust gas. This means that no draining device is needed for the moisture, which is the same as the second embodiment.

Moreover, due to evaporation of the moisture or liquid L in the furnace 17, the vapor pressure in the furnace 17 is decreased. Therefore, the liquid L separated from the mixture M1 is more likely to flow into the furnace 17 by way of the branch 23A compared with the apparatus 10 of the first embodiment. This means that the moisture removal from the mixture M1 is accelerated, which is the same as the second embodiment as well.

In the apparatus 10B of the third embodiment, the condensed moisture (i.e., the liquid L) separated from the first mixture M1 is designed to be placed on the moisture keeper device 26 in the furnace 17. Therefore, there is an additional advantage that the liquid L is prevented from flowing downward along the inner wall of the furnace 17 before its evaporation, and that the liquid L is prevented from being discharged from the outlet 22 provided at the bottom of the furnace 17.

Any structure is applicable to the moisture keeper device 26 if it is capable of keeping or holding the condensed moisture or liquid L temporarily. For example, simply, a plate-shaped member may be used for this purpose. The liquid L temporarily placed on the device 26 is evaporated by heat in the furnace 17 approximately simultaneously with or after a short period from the contact with the device 26. Then, the liquid L thus evaporated is discharged along with the other gaseous compound through the outlet 22.

A method for combustion harmfulness-elimination of PFC gas according to the third embodiment of the invention is carried out with the above-described apparatus 10B. In this method, like the first embodiment, the moisture quantity of the PFC gas obtained from the first mixture M1 is adjusted or decreased by the protrusions 25 and the branch 23 prior to combustion harmfulness-elimination of the PFC gas in the furnace 17. Therefore, in the method of the third embodiment, the same advantages as those of the apparatus 10B are obtainable.

EXAMPLE

To confirm the advantages of of the invention, the inventors conducted the following test.

The PEC gas discharged from a dry etching apparatus for semiconductor device fabrication was subjected to the combustion harmfulness-elimination process using the above-described apparatus 10A of the first embodiment of FIG. 2 and the above-described conventional apparatus 50 of FIG. 1 for a specific long time. Then, the pipes 15 and 55, the gas introduction sections 16 and 56, the combustion control sections 18 and 58, and the scraper sections (not shown) for these apparatuses 10 and 50 were checked with naked eyes. The check for the apparatus 10A of the first embodiment was conducted after the use of four months. On the other hand, the check for the conventional apparatus 50 was conducted after the use of 45 days.

The result of this check is shown in Table 1 below.

TABLE 1

| | PIPES 15 AND 55 | GAS INTRODUCTION SECTIONS 16 AND 56 | COMBUSTION CONTROL SECTIONS 18 AND 58 | SCRAPER SECTIONS |
|---|---|---|---|---|
| INVENTION | Δ | ○ | ○ | ⊚ |
| PRIOR-ART | Δ | Δ | Δ | X |

In Table 1, the signs ⊚, ○, Δ, and X have the following meanings, respectively.

⊚: No corrosion was found.

○: Slight yellow byproduct was attached.

Δ: corrosive byproduct was deposited or slight detachment of fluororesin coating was found X: Corrosion was found.

As soon from Table 1, with the prior-art apparatus 50, corrosive byproducts were found at all the positions after the use of only 45 days. The heavy corrosion was found at the scraper and as a result, replacement or the scraper was necessary. The heavy corrosion was found at the outlet 22 and the exhaust gas was leaked significantly.

On the other hand, with the apparatus 10 of the first embodiment, slight detachment of the fluororesin coating was found at only the introducing pipe 15 after the use or 4 months. Only slight byproducts were deposited on the other positions.

Thus, the advantages of the invention with respect to the prior-art apparatus 50 were confirmed.

VARIATIONS

Needless to say, the present invention is not limited to the above-described first to third embodiments. Any change or modification may be added to them within the spirit of the invention. For example, any other PFC gas than $SF_6$ and $CHF_3$ may be used. Also, any other structure than that shown in the above-described embodiments may be provided in the pipe for condensing the moisture in the first mixture M1.

While the preferred forms of the present invention have been described, it is to be understood that modifications will be apparent to those skilled in the art without departing from the spirit of the invention. The scope of the present invention, therefore is to be determined solely by the following claims.

What is claimed is:

1. An apparatus for combustion toxicity-elimination of PFC gas, comprising:

(a) a combustion furnace;

(b) a gas introduction section formed near the combustion furnace;

(c) a wet scrubber for wet-scrubbing a first gas; and (d) a connection pine for connecting the gas introduction section to the scrubber, the connection pine having a branch extending downward, wherein the connection pipe has a protrusion in its inside; and wherein the protrusion is located at a branching portion of the connection pipe from which the branch is extended; and wherein the protrusion is formed in such a way as to intersect with a flowing direction of the first gas.

2. The apparatus according to claim 1, wherein inner walls of the gas introduction section are coated by fluororesin.

3. The apparatus according to claim 1, wherein an introduction pipe is additionally provided in such a way as to be connected to the connection pipe at a location between the branch and the gas introduction section.

4. The apparatus according to claim 1, wherein the branch of the connection pipe is connected to the combustion furnace.

5. The apparatus according to claim 3, wherein said introduction pipe introduces a second gas into said gas introduction section.

6. The apparatus according to claim 1, further comprising:

a combustion control section connected between said gas introduction section and said combustion furnace.

7. The apparatus according to claim 6, further comprising:

a combustion gas introduction section that introduces a combustion gas into said combustion control section.

8. An apparatus for combustion toxicity-elimination of PFC gas, comprising:

(a) a combustion furnace;

(b) a gas introduction section formed near the combustion furnace;

(c) a wet scrubber for wet-scrubbing a first gas;

(d) a connection pipe for connecting the gas introduction section to the scrubber, the connection pipe having a branch extending downward and connected to the combustion furnace; and (e) a moisture keeper device provided at an end of the branch in the furnace.

* * * * *